US011391470B2

(12) United States Patent
Li et al.

(10) Patent No.: US 11,391,470 B2
(45) Date of Patent: Jul. 19, 2022

(54) TEMPERATURE-SENSING BULB SUPPORT FOR AIR-CONDITIONER INDOOR UNIT, AND AIR-CONDITIONER INDOOR UNIT

(71) Applicants: GD MIDEA HEATING & VENTILATING EQUIPMENT CO., LTD., Foshan (CN); MIDEA GROUP CO., LTD., Foshan (CN)

(72) Inventors: Bo Li, Foshan (CN); Yongfeng Xu, Foshan (CN); Meibing Xiong, Foshan (CN); Yongqiang Wan, Foshan (CN); Wentao Shu, Foshan (CN); Xiaolong Qian, Foshan (CN); Rufeng Chen, Foshan (CN)

( * ) Notice: Subject to any disclaimer, the term of this patent is extended or adjusted under 35 U.S.C. 154(b) by 396 days.

(21) Appl. No.: 16/490,600

(22) PCT Filed: Oct. 25, 2017

(86) PCT No.: PCT/CN2017/107635
§ 371 (c)(1),
(2) Date: Sep. 3, 2019

(87) PCT Pub. No.: WO2019/037228
PCT Pub. Date: Feb. 28, 2019

(65) Prior Publication Data
US 2020/0003433 A1    Jan. 2, 2020

(30) Foreign Application Priority Data

Aug. 25, 2017   (CN) .......................... 201710744820.5
Aug. 25, 2017   (CN) .......................... 201721088855.X

(51) Int. Cl.
*F24F 1/0007*   (2019.01)
*G01K 1/14*     (2021.01)
(Continued)

(52) U.S. Cl.
CPC ............. *F24F 1/0007* (2013.01); *F24F 11/00* (2013.01); *F24F 11/89* (2018.01); *G01K 1/00* (2013.01);
(Continued)

(58) Field of Classification Search
CPC .......... F24F 1/0007; F24F 11/00; F24F 11/89; F24F 2110/10; G01K 1/00; G01K 1/14; G01K 1/143; G01K 2201/00
See application file for complete search history.

(56) References Cited

U.S. PATENT DOCUMENTS 4,488,823 A * 12/1984 Baker .................... G01K 15/00
374/170
5,987,911 A * 11/1999 Arai ...................... F24F 1/0057
62/229

(Continued)

FOREIGN PATENT DOCUMENTS

CN     204629839 U    9/2015
EP     3096088 A1     11/2016

OTHER PUBLICATIONS

Search report for EP application 17922417.5.

*Primary Examiner* — Nathaniel T Woodward
*Assistant Examiner* — Philip L Cotey
(74) *Attorney, Agent, or Firm* — Kilpatrick Townsend & Stockton, LLP

(57) ABSTRACT

A temperature-sensing bulb support for an air-conditioner indoor unit, and an air-conditioner indoor unit are disclosed. The temperature-sensing bulb support includes: a support body. The support body is adapted to be fixed to a housing of the air-conditioner indoor unit. The support body defines a filter mesh positioning groove configured to accommodate an end frame bar of a filter mesh, and the support body further defines a temperature-sensing bulb accommodating groove configured to accommodate a temperature-sensing (Continued)

bulb. The temperature-sensing bulb accommodating groove is isolated from the filter mesh positioning groove by a partition wall, and the temperature-sensing bulb accommodating groove is located outside the filter mesh positioning groove. The temperature-sensing bulb is placed outside the filter mesh while protecting the temperature-sensing bulb, such that the temperature-sensing bulb can detect ambient temperature more accurately, aiding in increasing accuracy of control over the air-conditioner indoor unit.

18 Claims, 2 Drawing Sheets

(51) Int. Cl.
*G01K 1/00* (2006.01)
*G01K 1/143* (2021.01)
*F24F 11/00* (2018.01)
*F24F 11/89* (2018.01)
*F24F 110/10* (2018.01)

(52) U.S. Cl.
CPC ............... *G01K 1/14* (2013.01); *G01K 1/143* (2013.01); *F24F 2110/10* (2018.01); *G01K 2201/00* (2013.01)

(56) References Cited

U.S. PATENT DOCUMENTS

| | | | |
|---|---|---|---|
| 6,293,118 B1* | 9/2001 | Oh | G01K 1/14 374/E1.018 |
| 9,488,380 B2* | 11/2016 | Ino | G08C 17/02 |
| 2015/0177109 A1* | 6/2015 | Lockhart | G01F 1/00 702/182 |
| 2017/0205082 A1* | 7/2017 | Kim | F24F 11/30 |
| 2017/0370607 A1* | 12/2017 | Wang | F24F 11/30 |
| 2018/0112900 A1* | 4/2018 | Goel | F25B 29/003 |

* cited by examiner

TEMPERATURE-SENSING BULB SUPPORT FOR AIR-CONDITIONER INDOOR UNIT, AND AIR-CONDITIONER INDOOR UNIT

PRIORITY CLAIM AND RELATED APPLICATION

The present disclosure is a national phase application of International Application No. PCT/CN2017/107635, filed on Oct. 25, 2017, which claims the priority of Chinese Application No. 201721088855.X, filed in the Chinese Patent Offices on Aug. 25, 2017, and claims the priority of Chinese Application No. 201710744820.5, filed in the Chinese Patent Office on Aug. 25, 2017, the entireties of which are herein incorporated by reference.

FIELD

The present disclosure relates to a field of air-conditioner technology, and more particularly, to a temperature-sensing bulb support for an air-conditioner indoor unit, and an air-conditioner indoor unit.

BACKGROUND

In actual operation of an air-conditioning system, for accuracy of control and reliability of the system, it is necessary to precisely detect the ambient temperature. The actual temperature detected by a temperature-sensing bulb, as an element for detecting the external environmental temperature, directly affects accuracy of cooling effect.

Due to reasons of production and installation, the ambient-temperature-sensing bulb for most air-conditioners is mounted to or near a heat exchanger thereof. However, when a refrigerant having a temperature higher than the ambient temperature passes through the heat exchanger, it may generate heat radiation on the ambient-temperature-sensing bulb. Therefore, the temperature measured by the temperature-sensing bulb is a little higher than the actual ambient temperature, thereby affecting the control accuracy of the air-conditioner system and even normal operation of the air-conditioner system.

SUMMARY

Embodiments of the present disclosure proposes a temperature-sensing bulb support for an air-conditioner indoor unit, which may mitigate cold and heat radiation to the temperature-sensing bulb generated by the heat exchanger to a certain extent are described.

The present disclosure further proposes an air-conditioner indoor unit having the above-identified temperature-sensing bulb support.

The temperature-sensing bulb support for the air-conditioner indoor unit according to embodiments of the present disclosure includes a support body. The support body is adapted to be fixed to a housing of an air-conditioner indoor unit, the support body defines a filter mesh positioning groove configured to accommodate an end frame bar of a filter mesh, and the support body further defines a temperature-sensing bulb accommodating groove configured to accommodate a temperature-sensing bulb. The temperature-sensing bulb accommodating groove is isolated from the filter mesh positioning groove by a partition wall, and the temperature-sensing bulb accommodating groove is located outside the filter mesh positioning groove.

For the temperature-sensing bulb support for the air-conditioner indoor unit according to embodiments of the present disclosure, the temperature-sensing bulb is placed outside the filter mesh while protecting the temperature-sensing bulb, such that the temperature-sensing bulb can detect ambient temperature more accurately, thereby aiding in increasing accuracy of control over the air-conditioner indoor unit and the operational reliability of the air-conditioner indoor unit.

According to some embodiments of the present disclosure, the support body is further provided with an air inducing hole, the air inducing hole is located outside the filter mesh positioning groove, and the air inducing hole is communicated with the temperature-sensing bulb accommodating groove.

Furthermore, the support body is further provided with a temperature-sensing bulb fixation hole, and the temperature-sensing bulb fixation hole is located outside the filter mesh positioning groove.

In one embodiment, the temperature-sensing bulb accommodating groove is U-shaped and defined by a first side wall, a second side wall and a first connecting wall connected between the first side wall and the second side wall, and the filter mesh positioning groove is U-shaped and defined by a third side wall and a second connecting wall connected between the third side wall and the second side wall.

Furthermore, the second side wall is configured as the partition wall.

According to some embodiments of the present disclosure, an opening of the temperature-sensing bulb accommodating groove is directed opposite to an opening of the filter mesh positioning groove.

According to some embodiments of the present disclosure, the air inducing hole includes a first segment for the air inducing hole defined in the first side wall and a second segment for the air inducing hole defined in the first connecting wall. The first segment is communicated with the second segment at a junction of the first side wall and the first connecting wall.

In one embodiment, a plurality of air inducing holes are provided and spaced apart in a length direction of the temperature-sensing bulb support.

In one embodiment, the first side wall, the second side wall and the third side wall are parallel to one another. The first connecting wall is perpendicularly connected between the first side wall and the second side wall, and the second connecting wall is perpendicularly connected between the second side wall and the third side wall.

According to some embodiments of the present disclosure, an end of the first side wall away from the first connecting wall is provided with a fixation plate, and the fixation plate is adapted to be fixed to the housing of the air-conditioner indoor unit.

Furthermore, a perpendicular distance between the fixation plate and the first connecting wall is greater than a perpendicular distance between the second connecting wall and the first connecting wall.

According to some embodiments of the present disclosure, the temperature-sensing bulb support for the air-conditioner indoor unit further includes: an elastic piece. A fixed end of the elastic piece is fixed to an end of the second connecting wall, and a free end of the elastic piece is adapted to elastically abut against the housing of the air-conditioner indoor unit, such that it is adapted to press the end frame bar against an inside of the filter mesh positioning groove.

The air-conditioner indoor unit according to embodiments of another aspect of the present disclosure includes the above-mentioned temperature-sensing bulb support for the air-conditioner indoor unit.

Figure 1:
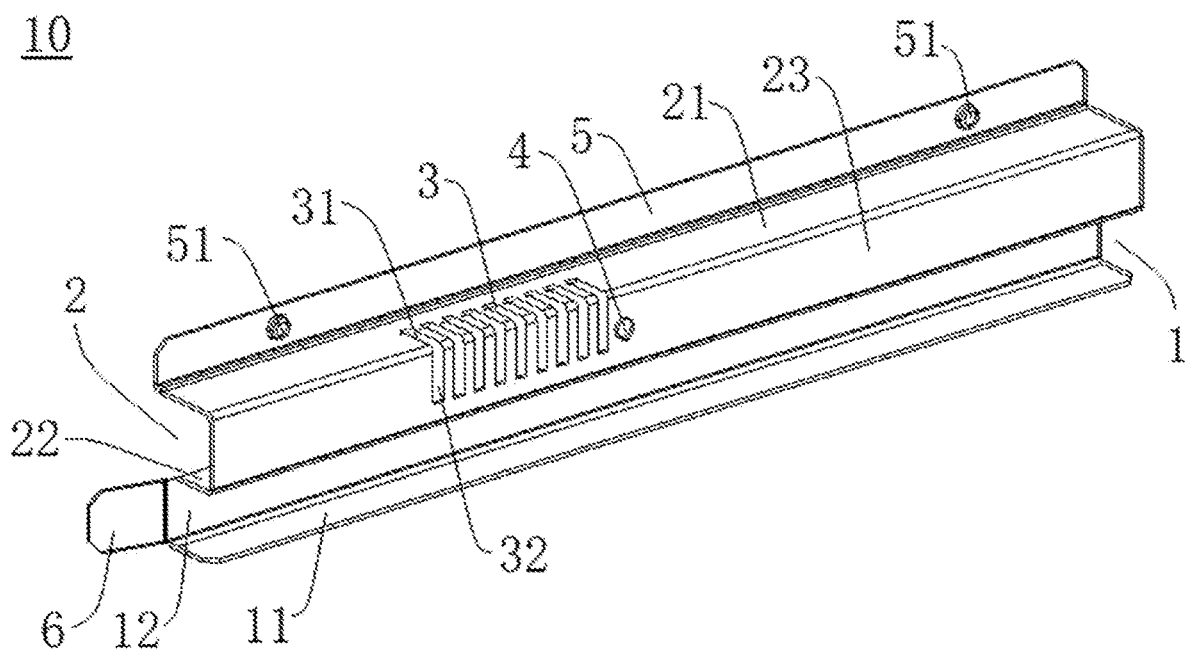
FIG. 1 is a perspective view illustrating a temperature-sensing bulb support for an air-conditioner indoor unit.

REFERENCE NUMERALS temperature-sensing bulb support 10, filter mesh positioning groove 11, third side wall 11, second connecting wall 12, temperature-sensing bulb accommodating groove 2, first side wall 21, second side wall (partition wall) 22, first connecting wall 23, air inducing hole 3, first segment 31 for air inducing hole, second segment 32 for air inducing hole, temperature-sensing bulb fixation hole 4, fixation plate 5, fixation point position 51, elastic piece 6, housing 20, end frame bar 30.

DETAILED DESCRIPTION

Embodiments of the present disclosure are described below in detail, examples of the embodiments are shown in accompanying drawings, and the same or similar elements and the elements having same or similar functions are denoted by like reference numerals throughout the descriptions. The embodiments described below with reference to the accompanying drawings are exemplary, are merely used to explain the present disclosure, and does not be construed as a limit to the present disclosure.

In the descriptions of the present application, terms such as "first" and "second" are used herein for purposes of description and are not intended to indicate or imply relative importance or significance. Thus, the feature defined with "first" and "second" may comprise one or more of this feature. In addition, unless specified or limited otherwise, the terms "mounted," "connected," "coupled," "fixed" and the like are used broadly, and may be, for example, fixed connections, detachable connections, or integral connections.

In the descriptions of the present application, terms such as "first" and "second" are used herein for purposes of description and are not intended to indicate or imply relative importance or significance. Thus, the feature defined with "first" and "second" may comprise one or more of this feature. In addition, unless specified or limited otherwise, the terms "mounted," "connected," "coupled," "fixed" and the like are used broadly, and may be, for example, fixed connections, detachable connections, or integral connections.

A temperature-sensing bulb support 10 for an air-conditioner indoor unit according to embodiments of the present disclosure will be described in detail with reference to FIG. 1 and FIG. 2.

Figure 2:
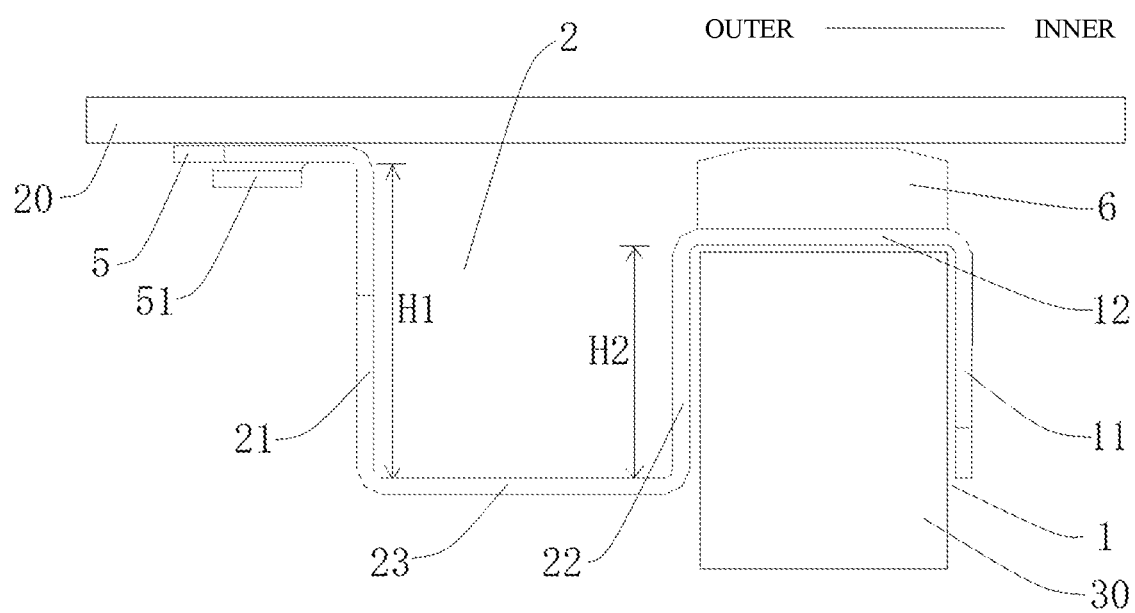
FIG. 2 is a cross-sectional view illustrating a temperature-sensing bulb support for an air-conditioner indoor unit.

As illustrated in FIG. 1 and FIG. 2, the temperature-sensing bulb support 10 for an air-conditioner indoor unit according to embodiments of the present disclosure may include a support body. The support body is adapted to be fixed to a housing 20 of an air-conditioner indoor unit. The support body defines a filter mesh positioning groove 1 therein. The filter mesh positioning groove 1 is configured to accommodate an end frame bar 30 of a filter mesh. The support body further defines a temperature-sensing bulb accommodating groove 2t. The temperature-sensing bulb accommodating groove 2 is configured to accommodate and protect a temperature-sensing bulb, thereby improving operational stability of the temperature-sensing bulb and prolonging service life of the temperature-sensing bulb. Furthermore, the temperature-sensing bulb accommodating groove 2 is isolated from the filter mesh positioning groove 1 by a partition wall 22, and the temperature-sensing bulb accommodating groove 2 is located outside the filter mesh positioning groove 1.

In other words, since the temperature-sensing bulb accommodating groove 2 is located outside the filter mesh positioning groove 1, the temperature-sensing bulb accommodating groove 2 enables the temperature-sensing bulb to be disposed outside the filter mesh while a heat exchanger is disposed inside the filter mesh. Disposing the temperature-sensing bulb outside the filter mesh increases a distance between the temperature-sensing bulb and the heat exchanger, thereby mitigating cold and heat radiation to the temperature-sensing bulb generated by the heat exchanger to a certain extent, ensuing more precise detection of indoor or outdoor ambient temperature by the temperature-sensing bulb, and avoiding the influence of the cold and heat radiation to the temperature-sensing bulb caused by a cold or hot refrigerant passing through the heat exchanger.

The temperature-sensing bulb transmits detected precise temperature information to the air-conditioner indoor unit, thereby facilitating accurate control of the indoor temperature for the air-conditioner indoor unit, improving user experience, realizing precise control of the air-conditioner load for the air-conditioner indoor unit and saving power for the user. Meanwhile, a precise temperature measurement of the temperature-sensing bulb also helps in avoiding large temperature fluctuations, which may reduce risks of frequent starts and stops of an air-conditioning system, and guarantee the operational reliability and service life of the air-conditioner indoor unit.

It should be noted that the "outside" mentioned herein refers to a side away from the air-conditioner indoor unit and the "inside" mentioned herein refers to a side adjacent to the air-conditioner indoor unit.

For the temperature-sensing bulb support 10 used for an air-conditioner indoor unit according to the present disclosure, the temperature-sensing bulb is placed outside the filter mesh while protecting the temperature-sensing bulb, such that the temperature-sensing bulb can detect ambient temperature value more accurately, thereby aiding in increasing accuracy of control over the air-conditioner indoor unit and the operational reliability of the air-conditioner indoor unit. Meanwhile, faulty operations conducted by the air-conditioner indoor unit due to misjudgment of the indoor temperature may be prevented, thereby achieving purposes of saving power and improving user comfort level.

In some embodiments of the present disclosure, the support body is further provided with an air inducing hole 3. The air inducing hole 3 is located outside the filter mesh positioning groove 1 and is communicated with the temperature-sensing bulb accommodating groove 2. The air inducing hole 3 may guarantee that air successfully passes the temperature-sensing bulb mounted in the temperature-sensing bulb accommodating groove 2, thus ensuring the accuracy of temperature detected by the temperature-sensing bulb.

Furthermore, as illustrated in FIG. 1, the support body is further provided with a temperature-sensing bulb fixation hole 4, and the temperature-sensing bulb fixation hole 4 is located outside the filter mesh positioning groove 1. The temperature-sensing bulb is fixed in the temperature-sensing bulb accommodating groove 2 by means of the temperature-sensing bulb fixation hole 4, so that a temperature-sensing probe of the temperature-sensing bulb may be accurately fixed at the air inducing hole 3 in favor of a precise temperature measurement. One or a plurality of temperature-sensing bulb fixation holes 4 may be provided.

When the air-conditioner system is in operation, the air-conditioner indoor unit starts running and sucks outdoor or indoor air to the temperature-sensing bulb accommodating groove 2 through the air inducing hole 3 in the temperature-sensing bulb support 10. The air flows through the temperature-sensing probe of the temperature-sensing bulb and the temperature-sensing bulb starts measuring the temperature. At the same time, since the temperature-sensing bulb is away from the heat exchanger, temperature measurement accuracy of the temperature-sensing bulb is thereby improved.

In one embodiment, as illustrated in FIG. 2, the temperature-sensing bulb accommodating groove 2 is U-shaped and defined by a first side wall 21, a second side wall 22 and a first connecting wall 23. The first connecting wall 23 is connected between the first side wall 21 and the second side wall 22. Similarly, the filter mesh positioning groove 1 is U-shaped and defined by a third side wall 11, the second side wall 22 and a second connecting wall 12. The second connecting wall 12 is connected between the third side wall 11 and the second side wall 22.

Furthermore, the second side wall 22 is configured as the above-described partition wall 22.

In some embodiments of the present disclosure, an opening of the temperature-sensing bulb accommodating groove 2 is directed opposite to an opening of the filter mesh positioning groove 1. For example, as illustrated in FIG. 2, the opening of the U-shape of the temperature-sensing bulb accommodating groove 2 faces upwards, and the opening of the U-shape of the filter mesh positioning groove 1 faces downwards. The temperature-sensing bulb accommodating groove 2 is separated from the filter mesh positioning groove 1 simply through the second side wall 22.

In some embodiments of the present disclosure, the air inducing hole 3 includes a first segment 31 for the air inducing hole and a second segment 32 for the air inducing hole. As illustrated in FIG. 1, the first segment 31 is defined in the first side wall 21 and the second segment 32 is defined in the first connecting wall 23. The first segment 31 is communicated with the second segment 32 at a junction of the first side wall 21 and the first connecting wall 23. The first segment 31 and the second segment 32 are both communicated with the temperature-sensing bulb accommodating groove 2. The air enters temperature-sensing bulb accommodating groove 2 through the first segment 31 and the second segment 32 and then passes by the temperature-sensing probe of the temperature-sensing bulb.

In one embodiment, as illustrated in FIG. 1, a plurality of air inducing holes 3 are provided and spaced apart in a length direction of the temperature-sensing bulb support 10, thereby aiding in increasing the amount of air entering the temperature-sensing bulb accommodating groove 2 and improving accuracy of ambient temperature detection. In addition, by arranging the air inducing holes 3 in a manner of the plurality of air inducing holes 3 being spaced apart, on the one hand, the amount of the induced air can be ensured, and on the other hand, a case where the temperature-sensing bulb suffers from impacts as the opening is large can be avoided.

In one embodiment, the first side wall 21, the second side wall 22 and the third side wall 11 are parallel to one another, the first connecting wall 23 is perpendicularly connected between the first side wall 21 and the second side wall 22, and the second connecting wall 12 is perpendicularly connected between the second side wall 22 and the third side wall 11. In FIG. 2, the second connecting wall 12 is parallel to the first connecting wall 23.

In some embodiments of the present disclosure, an end (an upper end as illustrated in FIG. 2) of the first side wall 21 away from the first connecting wall 23 is provided with a fixation plate 5. The fixation plate 5 is adapted to be fixed to the housing 20 of the air-conditioner indoor unit. In one embodiment, the fixation plate 5 may be provided with a fixation point position 51. The fixation plate 5 is fixed to the housing 20 of the air-conditioner indoor unit through the fixation point position 51. In one embodiment, a threaded fastener may penetrate through the fixation point position 51 and be provided to the fixation point position 51, such that the fixation plate 5 and the housing 20 are fixed by screwing. A plurality of fixation point positions 51 may be provided, thus it is ensured that the fixation between the fixation plate 5 and the housing 20 is reliable. In one embodiment illustrated in FIG. 1, two fixation point positions 51 are provided, and the two fixation point positions 51 are spaced apart along the length direction of the fixation plate 5.

Furthermore, a perpendicular distance H1 between the fixation plate 5 and the first connecting wall 23 is greater than a perpendicular distance H2 between the second connecting wall 12 and the first connecting wall 23. Therefore, a cantilever structure may be formed at the filter mesh positioning groove 1 (i.e., an U-shaped frame formed by the second side wall 22, the second connecting wall 23 and the third side wall 11), which leaves operational space for installation and facilitates an engagement and detachment of the end frame bar 30 in the filter mesh positioning groove 1.

In some embodiments of the present disclosure, the temperature-sensing bulb support 10 for the air-conditioner indoor unit further includes an elastic piece 6. A fixed end of the elastic piece 6 is fixed to an end of the second connecting wall 12, and a free end of the elastic piece 6 is adapted to elastically abut against the housing 20 of the air-conditioner indoor unit, so that it is adapted to press the end frame bar 30 against an inside of the filter mesh positioning groove 1. In other words, the free end of the elastic piece 6 extends away from the second connecting wall 12. When the elastic piece 6 is pressed against the housing 20 of the air-conditioner indoor unit, the elastic piece 6 exerts an opposing force on the second connecting wall 12, such that the second connecting wall 12 gets close to the end frame bar 30 of the filter mesh, thereby guaranteeing the fixation reliability of the end frame bar 30 in the filter mesh positioning groove 1.

An air-conditioner indoor unit according to embodiments of another aspect of the present disclosure includes the above-mentioned temperature-sensing bulb support 10 for the air-conditioner indoor unit.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples.

What is claimed is:

1. A temperature-sensing bulb support for an air-conditioner indoor unit, comprising a support body fixed to a housing of the air-conditioner indoor unit, wherein the support body comprises:
   a filter mesh positioning groove configured to accommodate a filter mesh; and
   a temperature-sensing bulb accommodating groove configured to accommodate a temperature-sensing bulb;
   wherein the temperature-sensing bulb accommodating groove is isolated from the filter mesh positioning groove by a partition wall, and the temperature-sensing bulb accommodating groove is located farther from the air-conditioner indoor unit than the filter mesh positioning groove such that indoor air passes from the temperature-sensing bulb accommodating groove to the filter mesh positioning groove;
   wherein both the temperature-sensing bulb accommodating groove and the filter mesh positioning groove are U-shaped, an opening of the temperature-sensing bulb accommodating groove is opposite to an opening of the filter mesh positioning groove.

2. The temperature-sensing bulb support according to claim 1, wherein the support body is further provided with an air inducing hole, the air inducing hole is located outside the filter mesh positioning groove, and the air inducing hole is communicated with the temperature-sensing bulb accommodating groove.

3. The temperature-sensing bulb support according to claim 2, wherein the support body is further provided with a temperature-sensing bulb fixation hole, and the temperature-sensing bulb fixation hole is located outside the filter mesh positioning groove.

4. The temperature-sensing bulb support according to claim 1, wherein the temperature-sensing bulb accommodating groove comprises a first side wall, a second side wall and a first connecting wall connecting the first side wall and the second side wall, and the filter mesh positioning groove comprises a third side wall and a second connecting wall connecting the third side wall and the second side wall.

5. The temperature-sensing bulb support according to claim 4, wherein the second side wall is configured as the partition wall.

6. The temperature-sensing bulb support according to claim 4, wherein the air inducing hole comprises a first segment for the air inducing hole defined in the first side wall and a second segment for the air inducing hole defined in the first connecting wall, and the first segment is communicated with the second segment at a junction of the first side wall and the first connecting wall.

7. The temperature-sensing bulb support according to claim 6, wherein a plurality of air inducing holes are provided and spaced apart in a length direction of the temperature-sensing bulb support.

8. The temperature-sensing bulb support according to claim 4, wherein the first side wall, the second side wall and the third side wall are parallel to one another, the first connecting wall is perpendicularly connected between the first side wall and the second side wall, and the second connecting wall is perpendicularly connected between the second side wall and the third side wall.

9. The temperature-sensing bulb support according to claim 4, wherein an end of the first side wall away from the first connecting wall is provided with a fixation plate, and the fixation plate is adapted to be fixed to the housing of the air-conditioner indoor unit.

10. The temperature-sensing bulb support according to claim 9, wherein a perpendicular distance between the fixation plate and the first connecting wall is greater than a perpendicular distance between the second connecting wall and the first connecting wall.

11. The temperature-sensing bulb support according to claim 10, further comprising: an elastic piece, wherein a fixed end of the elastic piece is fixed to an end of the second connecting wall, and a free end of the elastic piece is adapted to elastically abut against the housing of the air-conditioner indoor unit, such that it is adapted to press the end frame bar against an inside of the filter mesh positioning groove.

12. An air-conditioner indoor unit, comprising a temperature-sensing bulb support, wherein the temperature-sensing bulb support comprises a support body fixed to a housing of the air-conditioner indoor unit, and wherein the support body comprises:
   a filter mesh positioning groove configured to accommodate a filter mesh; and
   a temperature-sensing bulb accommodating groove configured to accommodate a temperature-sensing bulb;
   wherein the temperature-sensing bulb accommodating groove is isolated from the filter mesh positioning groove by a partition wall, and the temperature-sensing bulb accommodating groove is located farther from the air-conditioner indoor unit than the filter mesh positioning groove such that indoor air passes from the temperature-sensing bulb accommodating groove to the filter mesh positioning groove;
   wherein both the temperature-sensing bulb accommodating groove and the filter mesh positioning groove are U-shaped, an opening of the temperature-sensing bulb accommodating groove is opposite to an opening of the filter mesh positioning groove.

13. The air-conditioner indoor unit according to claim 12, wherein the support body is further provided with an air inducing hole, the air inducing hole is located outside the filter mesh positioning groove, and the air inducing hole is communicated with the temperature-sensing bulb accommodating groove.

14. The air-conditioner indoor unit according to claim 13, wherein the support body is further provided with a temperature-sensing bulb fixation hole, and the temperature-sensing bulb fixation hole is located outside the filter mesh positioning groove.

15. The air-conditioner indoor unit according to claim 12, wherein the temperature-sensing bulb accommodating groove comprises a first side wall, a second side wall and a first connecting wall connected between connecting the first side wall and the second side wall, and the filter mesh positioning groove comprises a third side wall and a second connecting wall connecting the third side wall and the second side wall.

16. The air-conditioner indoor unit according to claim 15, wherein the second side wall is configured as the partition wall.

17. The air-conditioner indoor unit according to claim 15, wherein the air inducing hole comprises a first segment for the air inducing hole defined in the first side wall and a second segment for the air inducing hole defined in the first connecting wall, and the first segment is communicated with the second segment at a junction of the first side wall and the first connecting wall.

18. The air-conditioner indoor unit according to claim 17, wherein a plurality of air inducing holes are provided and spaced apart in a length direction of the temperature-sensing bulb support.

* * * * *